United States Patent

[11] 3,607,165

| [72] | Inventor | Bernard M. Guthrie |
| | | P. O. Box 434, Corvallis, Oreg. 97330 |
| [21] | Appl. No. | 806,334 |
| [22] | Filed | Jan. 31, 1969 |
| [45] | Patented | Sept. 21, 1971 |

[54] GLASS FIBER FORMING APPARATUS
13 Claims, 4 Drawing Figs.

[52] U.S. Cl. .................................................. 65/14, 65/11, 65/15
[51] Int. Cl. ...................................................... C03b 37/04
[50] Field of Search ........................................... 65/1, 2, 4, 9, 6, 8, 11 R, 11 W, 21

[56] References Cited
UNITED STATES PATENTS

| 2,294,588 | 9/1942 | Pazsiczky | 65/15 |
| 3,080,736 | 3/1963 | Mabru et al. | 65/1 X |
| 3,332,110 | 7/1967 | Strong | 65/UX |
| 3,343,933 | 9/1967 | Mallan et al. | 65/6 X |
| 3,346,356 | 10/1967 | Anderson et al. | 65/6 X |

Primary Examiner—S. Leon Bashore
Assistant Examiner—Robert L. Lindsay, Jr.
Attorney—Buckhorn, Blore, Klarquist and Sparkman ABSTRACT: A glass fiber forming apparatus comprises a cup-shaped spinner rotated about a vertical axis. Glass is fed to the spinner near the center and evenly distributed by spinning action. Spinner rim is serrated to divide glass into separate streams. Spinner is surrounded by heating means and glass fibers are blown downwardly into pneumatic conveyor for collection and removal.

PATENTED SEP21 1971

BERNARD M. GUTHRIE
INVENTOR

BY BUCKHORN, BLORE, KLARQUIST & SPARKMAN
ATTORNEYS

BERNARD M. GUTHRIE
INVENTOR

BY
BUCKHORN, BLORE, KLARQUIST & SPARKMAN
ATTORNEYS

GLASS FIBER FORMING APPARATUS

SUMMARY OF THE INVENTION

An object of the invention is to provide apparatus capable of producing glass fibers of highly uniform diameter and free of "slugs."

Another object is to provide glass fiber forming apparatus that is of uncomplicated design and of long life.

The illustrated embodiment of the apparatus of the invention comprises a cup-shaped spinner adapted to be rotated at high velocity about a vertical axis. Molten glass is delivered to the spinner near the center, the spinner preferably being formed with a plurality of concentric recesses of flat bottom and vertical wall so that the molten glass is caused to be distributed in a thin, even film to the rim of the spinner. The spinner is formed with an outwardly sloping rim having radial serrations which divide the glass into uniform streams. The glass streams flow upwardly through such serrations and are projected outwardly from the top of the rim and attenuated into fine fibers.

A furnace assembly is provided over the spinner to heat the same and means are invention, the to blow the glass streams emerging from the spinner downwardly and into a pneumatic collecting conveyor of unique design.

DRAWINGS

DETAILED DESCRIPTION

Figure 1:
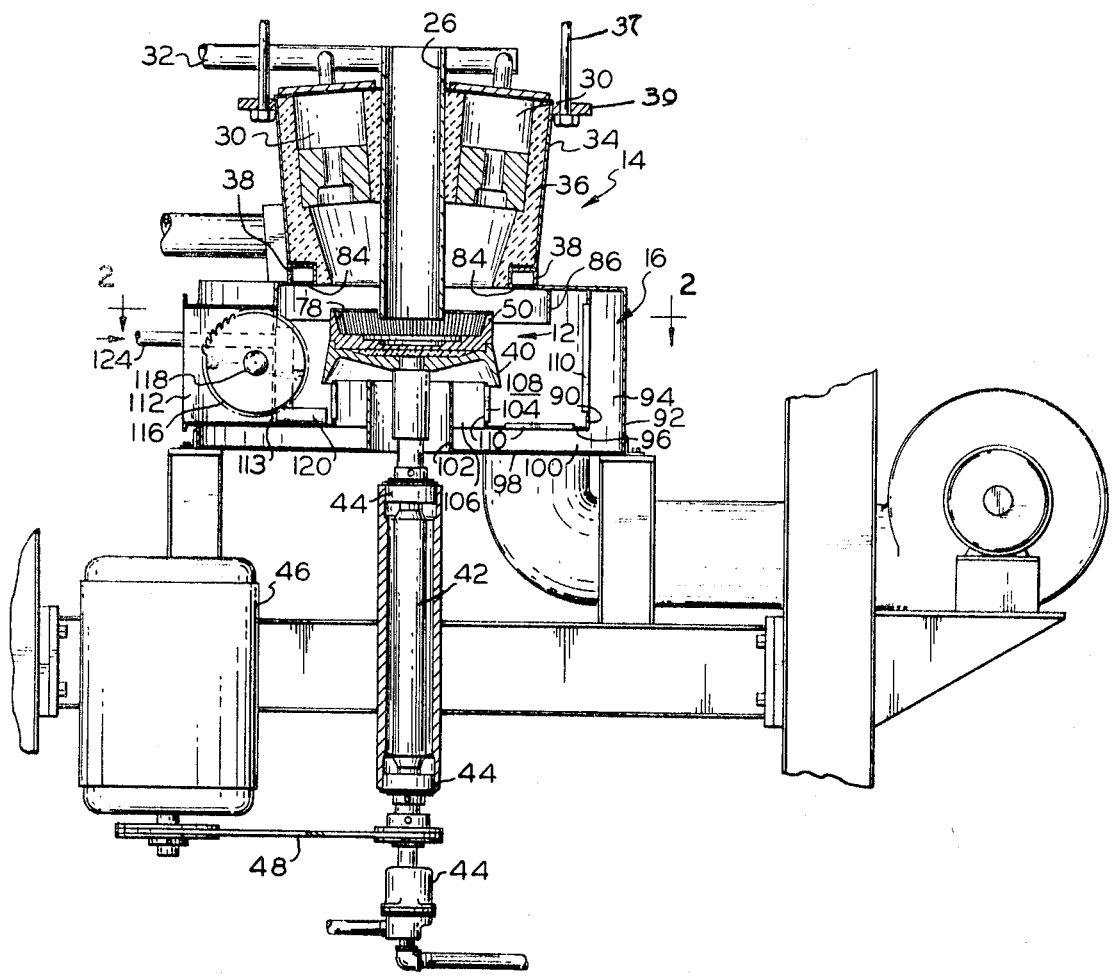
FIG. 1 is an elevation, partly in section, of apparatus constructed in accordance with the invention, the section being taken along line 1—1 of Fig. 2.

Referring now to the drawings, the apparatus of the invention includes as basic elements a suitable source of molten glass 10 which may be any one capable of supplying molten glass at a given rate and given temperature, a spinner 12 for forming filaments from the molten glass, a drop furnace 14 for heating the spinner and maintaining the molten glass at the desired temperature, and a conveyor 16 for conveying away the glass fibers formed.

The glass source 10, as indicated, may be any conventional source, and the glass may be prepared as by heating glass cullets, such as for example glass marbles, or by heating suitable ingredients so as to form a molten glass of the desired characteristics. Any suitable means may be provided for controlling the discharge of glass, the means shown comprising a tube 20 having an aperture 22 at its lower end adapted to be closed by a stop rod 24. As is well known, the rate of flow of glass through the aperture 22 can be controlled by the position of the stop rod 24. The aperture 22 is coaxial with a drop tube 26 of the drop furnace 14. The drop tube 26 is formed of suitable refractory material. The drop tube minimizes heat loss by radiation from the glass stream flowing through the same and also shields the glass stream from the high velocity gases from the heating devices associated with the spinner so that the stream of glass will hit the spinner 12 at the desired location. The drop furnace 14 includes a number of burners 30 arranged around the drop tube 26 so as to direct a curtain of heating flame around the lower end of the drop tube 26 and upon the spinner 12. The burners 30 may be of any conventional gas burning type and are supplied from a suitable source through an inlet 32. The number of burners will vary depending upon their design but a sufficient number is utilized to supply the desired heat and may be from four to eight or more in number, The burners 30 are suitably supported within an outer casing 34 having a refractory lining 36. The drop furnace 14 is supported by bolts 37 and flange 39 from a suitable support such that the furnace can be raised or lowered to adjust the height of the drop tube from the spinner 12. If the spacing is too great the glass stream bounces from the spinner; if it is too little insufficient gas flows upwardly through the tube to maintain the temperature of the glass stream.

An annular air duct 38 is provided at the lower end of the lining 36 for a purpose to be more fully explained later.

Figure 3:
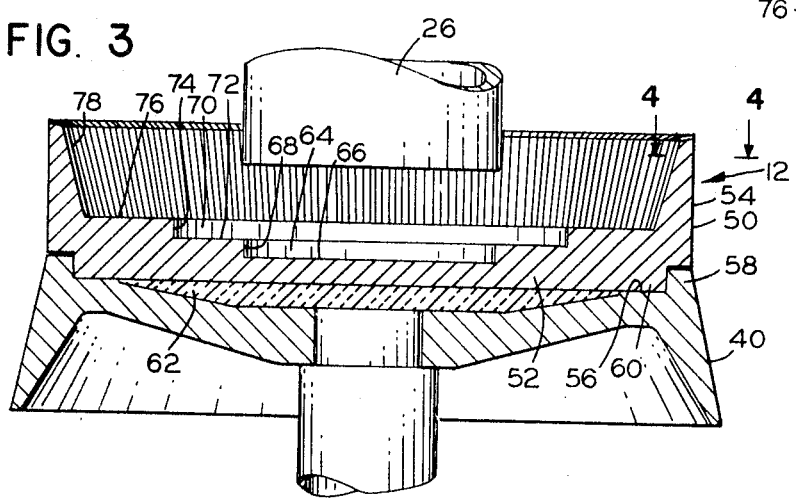
FIG. 3 is an enlarged sectional view of a spinner constructed in accordance with the invention.

The spinner 12 includes a base portion 40 mounted on the upper end of a rotatable hollow shaft 42 which is preferably water-cooled and is suitably supported in water-cooled bearings 44 and driven from a motor 46 by suitable means such as the belt and pulleys indicated at 48. Referring to FIG. 3, the base 40 supports a cuplike spinner body 50 which includes a bottom wall 52 and a rim 54. The bottom wall 52 is preferably spaced from the rotor body 40 over a substantial portion of its area so as to inhibit the transfer of heat from the spinner body to the base. The space between the spinner body and the base 40 may be filled with insulating material such as bentonite, mica, diatomaceous earth, etc. In the illustrated embodiment, the rotor base is provided with an annular, horizontal, seating surface 56 and an annular flange 58.

The bottom wall 52 may be flat or conical sloping upwardly to the rim but preferably is formed with means to assist in the distribution of the glass so as to reach the rim 54 at a substantially uniform rate throughout. Thus, the bottom wall may be provided with one or more concentric recesses which define one or more upward steps from the center of the body toward the rim, the illustrated embodiment of the invention including a central recess 64 having a flat, horizontal bottom 66 and a vertical side wall 68. Surrounding the recess 64 is an annular recess 70 having a flat bottom 72 and a vertical sidewall 74. Surrounding the recess 70 is another flat, horizontal, annular surface 76 which extends to the rim 50.

The inner side surface of the rim 54 is inclined outwardly from the bottom wall 52 to an acute angle that is preferably less than 20 degrees from the vertical, while the top surface of the rim is inclined upwardly at an angle between about 2° and 15° from the horizontal. Both the inner side surface and top surface of the rim are provided with a plurality of radially aligned serrations 78 about 1/16 inch deep, there being about 12 to 14 serrations per inch, the serrations of the top surface of the rim being exactly aligned with the serrations in the inner side surface. In the operation of the spinner, the serrations provide a means for effecting separation of the molten glass into individual filaments.

The spinner base 40 is preferably of metal alloy having high strength at high temperatures and may for example be high nickel alloy. Similarly, the spinner body 50 may be of a metal alloy having high strength but it also may be formed of a ceramic such as alumina.

Reference is made above to the duct 38. This duct defines a so-called blow-ring for providing a curtain of air moved downwardly around the spinner 12. The bottom wall of the duct 38 is provided with a plurality of openings 84 which are preferably radially spaced apart as well as circumferentially so as to provide a relatively wide stream of air surrounding the spinner. An annular wall or baffle 86 is also preferably provided immediately outwardly from the path of the air curtain so as to direct it downwardly around the spinner 12.

Figure 2:
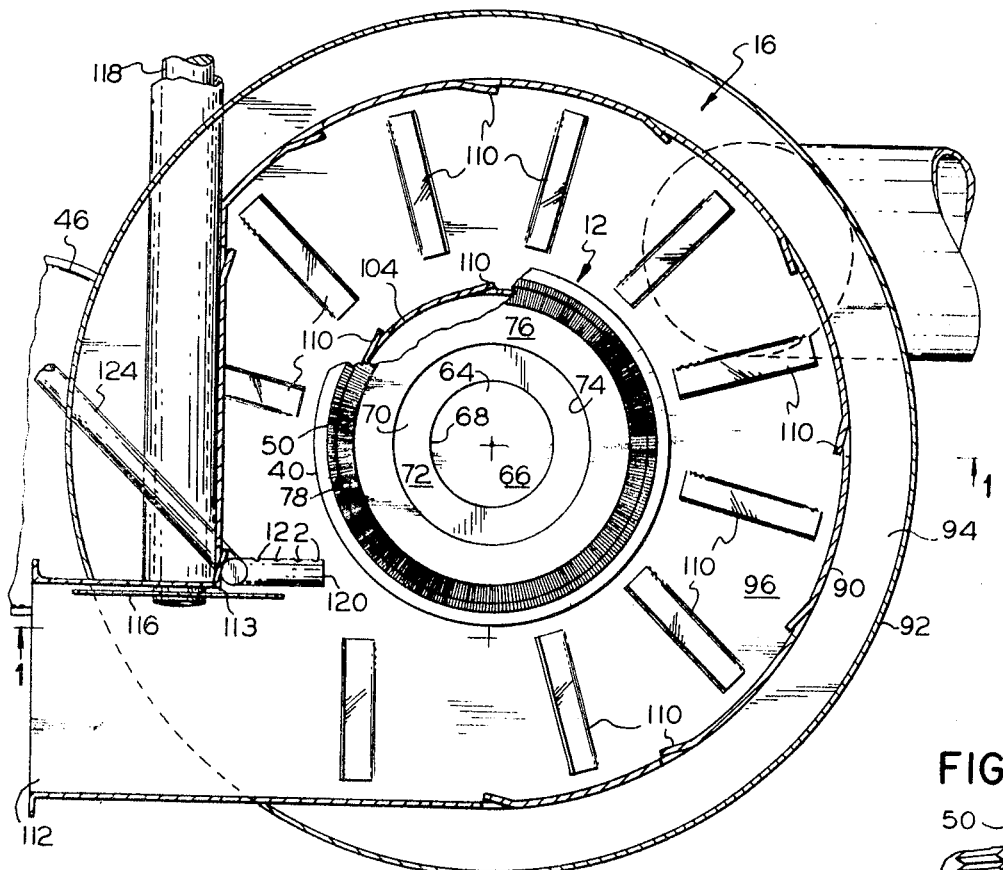
FIG. 2 is an enlarged sectional view taken along line 2—2 of Fig. 1.
Figure 4:
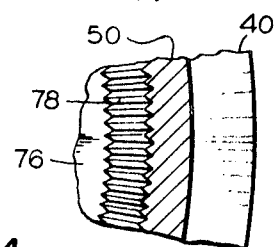
FIG. 4 is an enlarged fragmentary section taken along line 4—4 of Fig. 3.

Means are provided to collect and convey away the fiber glass which is formed. In the illustrated embodiment, such means comprises a pneumatic conveyor 16, the conveyor including a pair of spaced apart, concentric walls 90, 92 which define an outer duct or plenum 94 for supplying air to the conveyor. THe duct also includes a pair of bottom walls 96, 98 which define a lower duct or plenum 100 also for the purpose of supplying air to the conveyor. The conveyor also includes a pair of inner vertical walls 102, 104 which define an inner duct 106 for supplying air to the conveyor. As is most clearly apparent in Fig. 1, the ducts 106, 100, 94 in fact form a continuous plenum in communication with one another. The walls 90, 96, 104 define a conveying channel 108 in which the glass fibers are received as they are blown downwardly by the airblast emerging from the blow-ring 38. The walls 90, 96 104 are provided with louvers 110 (Fig. 2) arranged to create a clockwise rotation of the air flow in the channel 108 so as to carry the glass fibers toward a tangential discharge duct 112 through which the fibers are conveyed to their point of use.

Cutting means are provided at the confluence of the discharge duct 112 with the collecting channel 108 to prevent collection of fibers at such point, such means comprising a circular saw blade 116 mounted on a shaft 118 and driven from a suitable motor (not shown). To assure that fibers will not collect on the saw blade, an air outlet in the form of small length of pipe 120 having openings 122 therein is mounted beside the blade 116 in a clockwise direction therefrom with the openings 122 also arranges so as to blow in a clockwise direction in the channel 108, the pipe 120 being supplied with air under high pressure from a suitable source through a connecting pipe 124. The blast of air from the openings 122 assures that none of the fibers impinging on the saw blade 116 remain attached to the saw but are blown around the conveyor at a uniform rate so as to be discharged through the discharge port 112.

OPERATION

In the operation of the device, the glass source is brought to the desired temperature and the drop furnace 14 is turned on to bring the spinner 12 to its desired operating temperature, which is preferably between about 1750° to 2000° Fahrenheit. The temperature of the spinner is somewhat limited by the material utilized. It has been found that with a ceramic material generally somewhat higher temperatures can be utilized than with high temperature metals or alloys. When all of the portions of the device have reached their proper temperature, the spinner is brought up to operating speed which for a spinner of 10-inch diameter will be about 3000 r.p.m. The air in the conveying system is then started and the air for the blow-ring 38 also commenced and then glass is permitted to feed at the desired rate through the aperture 22 of the glass source discharge. The flow rate is adjusted as experience dictates will be necessary to obtain fibers of the desired size. The molten glass discharging from the glass source is caused to fall upon the spinner about an inch from the center of the lower recess 64.

I have found that delivery of glass to one side of the center of the spinner causes the glass to be distributed much more evenly over the spinner. When delivered at the very center, it tends to be whipped in uneven amounts to the rim 54. The centrifugal force created by the rapidly spinning body will cause the glass to flow from the lower recess 64 substantially uniformly outwardly to the wall 68 and thence flow upwardly along said wall to its upper edge and then to flow along the surface 72 of the recess 70. As the glass flows outwardly from the center of the spinner, it will, of course, spread more and more uniformly. The glass flowing upwardly into the second cup 70 will flow to the outer wall 74 thereof and thence will flow over such wall and over the surface 76 to the inner surface of the rim 54. By this time the glass is substantially uniformly distributed around the surface of the body and segments or slugs, that is, large masses of glass, have been substantially eliminated. The centrifugal force imposed on the glass by the rapid rotation of the spinner will cause the glass to flow upwardly through the notches formed by the serrations 78 and to separate into individual streams of glass.

The glass streams will move up the vertical slots in the rim of the spinner at a relatively low speed but because of the centrifugal effect of the rapidly rotating spinner body, substantial energy is stored in the glass. Accordingly, as the glass moves over the top surface of the spinner, the glass accelerates rapidly to relatively high velocities to attenuate itself and draw itself out into a fiber of relatively small diameter. Because of the uniform distribution of the glass which is obtained in the spinner of the invention, the glass fibers emerging from the various grooves around the surface of the spinner will be substantially uniform in diameter.

The downwardly blowing curtain of air from the blow-ring 38 also has the effect of attenuating the glass fibers and also causes the fibers to be moved downwardly into the collecting chamber 108 of the conveyor 16. The airflow in the conveyor 16 will cause the fibers to be moved around the spinner body to the discharge duct 112. As explained previously, the saw 116 severs the fibers which might otherwise end to collect upon the junction of the duct wall 113 and the outer wall 90 of the collecting chamber 108.

By adjusting the operating conditions, e.g., glass composition and/or temperature, spinner speed, blowing pressures, etc., the characteristics of the fiber produced can be varied from a very fine fiber of short length and low mechanical strength to long staple fibers.

Having illustrated a preferred embodiment of the invention, it should be apparent it permits of modification in arrangement and detail.

I claim:

1. Apparatus for the manufacture of fiber glass comprising:
   a cup-shaped spinner body mounted for rotation about a vertical axis with the open end of said body facing upwardly,
   said spinner body having a bottom surface and a rim with radially serrated inner and top surfaces,
   means for driving said spinner body about said axis, glass-feeding means mounted over said spinner body for feeding a stream of molten glass to the bottom surface of said body,
   drop furnace means for maintaining said glass stream and said spinner body at a substantially uniform high temperature comprising a refractory tube coaxial with said body and extending between said body and said tube feeding means so that glass flowing from said feeding means drops in a stream through said tube, and a plurality of burners positioned around said tube for heating said tube and said spinner body,
   said tube having a lower end spaced from but in close proximity to the bottom surface of said spinner body and having a diameter substantially less than that of said rim and substantially greater than that of said stream of molten glass,
   said burners being arranged to direct a curtain of flame downwardly into said spinner body in the space between said rim and the lower end of said tube in a manner so that hot gases from said flame are forced upwardly through said tube to maintain the temperature of the molten glass stream passing downwardly therethrough,
   means for providing a downwardly moving curtain of air outwardly adjacent the periphery of said spinner body for attenuating threads of glass discharged from the periphery of said rim and directing said threads downwardly,
   and an annular pneumatic conveyor positioned beneath and in surrounding relation to said spinner body for receiving glass fibers formed from said spinner body and driven downwardly by said curtain of air.

2. The apparatus of claim 1 wherein said conveyor comprises means defining an annular channel for receiving said glass fibers,
   means defining an exit channel from said annular channel, and
   means for inducing airflow in a given direction around said annular channel and into said exit channel so as to impel the glass fibers from said annular channel and into said exit channel.

3. The apparatus of claim 2 comprising means at the juncture of said exit channel and said annular channel for severing glass fibers impinging upon said juncture.

4. Apparatus for the manufacture of fiber glass comprising:
   a cup-shaped spinner body mounted for rotation about a vertical axis with the open end of said body facing upwardly,
   means for driving said spinner body about said axis, glass-feeding means mounted over said spinner body for feeding a stream of molten glass upon said body,
   means for maintaining said glass stream and said spinner body at a substantially uniform high temperature comprising a refractory tube coaxial with said body and extending between said body and said glass-feeding means whereby glass flowing from said source drops in a stream through said tube, and a plurality of burners positioned around said tube for heating said tube and said spinner body, means for providing a downwardly moving curtain of air adjacent the periphery of said spinner body, a pneumatic conveyor positioned beneath said spinner body for receiving glass fibers formed from said spinner body, said conveyor comprising means defining an annular channel for receiving said glass fibers, means defining an exit channel from said annular channel, means for inducing airflow in a given direction around said annular channel and into said exit channel so as to impel the glass fibers from said annular channel and into said exit channel, and means at the juncture of said exit channel and said annular channel for severing glass fibers impinging upon said juncture, said severing means comprising a circular saw blade and means for driving said blade for rotation about a horizontal axis.

5. The apparatus of claim 4 including air jet means for providing jets of air adjacent said saw blade to induce movement of severed fibers away from said blade and into said annular channel.

6. Apparatus for the manufacture of fiber glass comprising:
a spinner body mounted for rotation about a vertical axis,
means for rotating said spinner body including a vertical shaft and means mounting said body on said shaft,
means for feeding heat-softened glass upon said body,
said body having a bottom wall and a rim,
said rim having an inner surface inclined outwardly from said bottom wall at an acute angle from the vertical and a top surface inclined upwardly from said rim inner surface at an acute angle from the horizontal,
said surfaces being provided with contiguous radial serrations throughout their circumference with the serrations of said top surface being continuations of the serrations of said inner surface within which heat-softened glass flows in small separated streams as said body rotates about said axis,
said inner surface being inclined outwardly from said bottom wall and said top surface being inclined upwardly from said inner surface at such angles as to cause molten glass fed to the bottom wall of said spinner body to be divided into threads and held separated within said serrations, and causing said threads to be attenuated and released from the peripheral ends of serrations at great speed upon rotation of said spinner body,
said serrations each being of just sufficient size in depth and width to discharge a single thread at a time.

7. The apparatus of claim 6 wherein said rim inner surface is inclined outwardly from said bottom wall at an acute angle less than about 20° from the vertical and said top surface is inclined upwardly at an acute angle less than about 15° from the horizontal.

8. The apparatus of claim 6 wherein said feeding means includes a tube positioned above said spinner body coaxial therewith, and means adjustably mounting said tube to permit the position thereof to be adjusted vertically with respect to said spinner body.

9. The apparatus of claim 6 including means for providing a blast of air downwardly around said spinner body.

10. The apparatus of claim 8 including conveyor means for receiving the glass fibers and conveying the fibers away from the spinner.

11. The apparatus of claim 10 wherein said conveyor means comprises a pneumatic conveyor.

12. A spinner for the manufacture of fiber glass comprising:
a cup-shaped body mounted for rotation about a vertical axis with the open end of said body facing upwardly,
said body having a horizontally disposed, flat bottomed center portion defined by a first upstanding vertical wall concentric with said axis,
said body having a first annular horizontally disposed surface extending radially outwardly from said first vertical wall and defined by a second vertical wall extending upwardly from said first annular surface,
said body having a second annular, horizontally disposed surface extending radially outwardly from said second vertical wall,
said body having a rim defining an outer wall extending upwardly from said second surface and being inclined upwardly and outwardly at an angle of less than about 20° to the vertical,
said rim having a top surface extending upwardly and outwardly from said outer wall at an angle of less than about 15° to the horizontal,
said outer wall and said top surface each being serrated throughout their extent to define radial grooves in which the molten glass may flow 13. Apparatus for the manufacture of fiber glass comprising:
a spinner body mounted for rotation about a vertical axis,
said body having a bottom wall and a rim,
said rim having an inner surface inclined outwardly from said bottom wall at an acute angle from the vertical and a top surface inclined upwardly from said rim inner surface at an acute angle from the horizontal,
said surfaces being provided with a plurality of aligned radial grooves through which heat-softened glass is adapted to flow in small separated streams as said body rotates about said axis.
means for rotating said spinner body including a vertical shaft and means mounting said body on the top of said shaft,
means for feeding heat-softened glass upon said body,
pneumatic conveyor means for receiving the glass fibers and conveying the fibers away from the spinner,
said pneumatic conveyor comprising means defining a circular channel substantially concentric with said spinner body for receiving glass fibers descending from said spinner body,
a discharge duct communicating with said channel and extending tangentially therefrom,
and severing means at the junction of the outer wall of said channel and said discharge duct for severing fibers driven thereagainst.

UNITED STATES PATENT OFFICE
CERTIFICATE OF CORRECTION

Patent No. 3,607,165      Dated Sept. 21, 1971

Inventor(s) Bernard M. Guthrie

It is certified that error appears in the above-identified patent and that said Letters Patent are hereby corrected as shown below:

Column 1, line 23, after "are" omit "invention the" and insert in place thereof --provided--. Column 2, line 62, "THe" should be --The--. Column 3, line 9, "arranges" should be --arranged--. Column 4, line 2, "end" should be --tend--. Column 4, line 28, omit "tube".

Signed and sealed this 21st day of March 1972.

(SEAL)
Attest:

EDWARD M. FLETCHER, JR.         ROBERT GOTTSCHALK
Attesting Officer               Commissioner of Patents